No. 683,474. Patented Oct. 1, 1901.
R. F. MACKINZIE.
CONFECTIONERY KETTLE.
(Application filed Dec. 11, 1900.)
(No Model.)
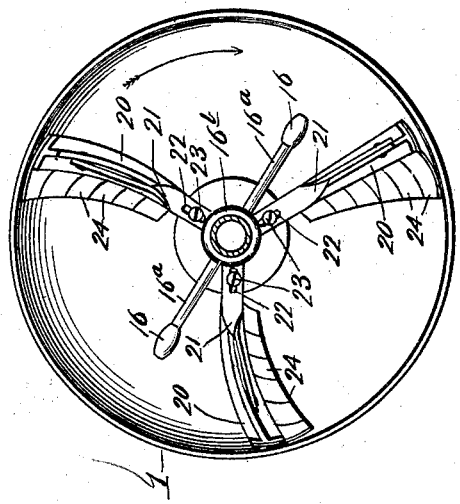
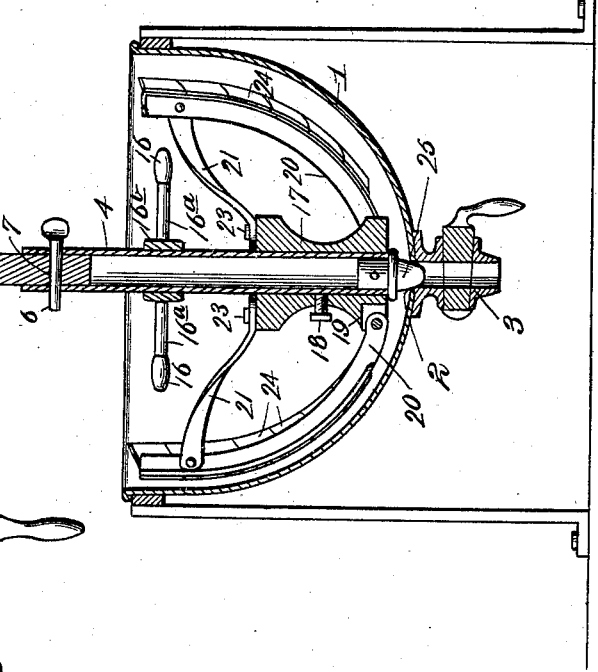
Witnesses
R. F. Mackinzie, Inventor.

UNITED STATES PATENT OFFICE.

ROBERT F. MACKINZIE, OF CLEVELAND, OHIO.

CONFECTIONERY-KETTLE.

SPECIFICATION forming part of Letters Patent No. 683,474, dated October 1, 1901.

Application filed December 11, 1900. Serial No. 39,534. (No model.)

*To all whom it may concern:*

Be it known that I, ROBERT F. MACKINZIE, a citizen of the Kingdom of Great Britain, residing at Cleveland, in the county of Cuyahoga and State of Ohio, have invented certain new and useful Improvements in Confectionery-Kettles, of which the following is a specification, reference being had therein to the accompanying drawings.

This invention relates to stirrers and grainers, and particularly to that class for use in graining candy when in the process of manufacture.

The object of the invention is to provide a kettle and in combination therewith a series of adjustably-secured blade-ribs for agitating the contents of the kettle.

Furthermore, the object of the invention is to provide graining-blades which will have a tendency to distribute the contents of the kettle over the inner surface thereof and to provide other blades with a function for removing the deposits from the inner surface by a scraping action.

Furthermore, the object of the invention is to provide a stirrer and grainer which may be elevated and suspended above the mouth of the kettle.

A further object of the invention is to produce a stirrer and grainer which will possess advantages in points of simplicity, durability, and efficiency, proving at the same time comparatively inexpensive to manufacture and sustain.

In describing the invention in detail reference will be had to the accompanying drawings, forming part of this specification, wherein like characters denote corresponding parts in both views, and in which—

Figure 1 is a view in elevation, partly in section, showing a kettle with a stirrer and grainer embodying the invention applied, said stirrer and grainer being connected to its operating mechanism. Fig. 2 is a plan view of the kettle with the stirrer and grainer in place, the stirrer and grainer shaft being in section.

In the drawings, 1 denotes the kettle, having a central outlet-opening 2, which is guarded by a valve 3 of any ordinary construction, preferably of the turning-plug type, as it can be readily kept unobstructed.

A tubular shaft 4 is slidable on a vertically-disposed shaft 5, and the shaft 4 is secured to the shaft 5 by means of the pin 6, passing through the tubular shaft and entering the apertures 7 of said shaft 5. This shaft 5 has a bearing in the bracket 8 of the hanger 9, and the hanger has a bearing for the power-shaft 10.

A clutch-gear is mounted on the power-shaft and is held in place by the collar 12, said clutch-gear taking motion from the clutch 13, splined on the power-shaft. The clutch-operating lever 14 may be of any preferred construction for throwing the clutch into and out of engagement with the clutch-gear. A pinion 15, secured on the shaft 5, meshes with the clutch-gear and is driven thereby.

The shaft 4 is provided with handles 16, by which the stirrer is elevated or lowered. The handles are formed on the ends of the arms $16^a$, extending outwardly from the collar $16^b$ on the said shaft.

A spool 17 fits over the lower end of the shaft 4, and the screw 18, threaded in the spool, is employed to bind it to said shaft. The lower end of the spool has its periphery recessed, as shown at 19, and the lower ends of the ribs 20 are pivoted in said recesses. The ribs are T shape in cross-section. The upper ends of the ribs are held in a predetermined position with relation to the inner surface of the kettle through the medium of the arms 21, having their outer ends pivoted to the webs of the ribs and their inner ends provided with slots 22 to receive the bolts 23, which are threaded in the upper end of the spool. The outer surfaces of the ribs have secured thereon the blades, comprising a series of resilient metallic strips 24, having their ends attached to the ribs and their free ends extending at such angle as to have a tendency to elevate the contents of the kettle as the stirrer and grainer is rotated.

From an inspection of Fig. 2 it will be observed that the blades of two of the arms face each other and that two of the ribs have blades extending in the direction opposite the direction of rotation, which is indicated by the arrow. As has been stated, the object of the last-named blades is to grain the contents of the kettle by elevating it and distributing it over the inner surface, and the object of the blade which faces the agitating-blades is for removing the deposit.

The ribs having the blades extending in the direction opposite the direction of rotation should lean back toward the top, so that said blades will have a further tendency to raise the material in the kettle from the bottom, thus more effectually agitating and graining the contents.

A guide-pin 25 depends from the lower end of the spool and rotates in the opening in the bottom of the kettle.

The construction, operation, and advantages will, it is thought, be understood from the foregoing description, and it will be noted that the driving mechanism may be of any desired construction and that changes in the proportions and other details of construction may be resorted to for successfully carrying the invention into practice.

Having fully described the invention, what I claim as new, and desire to secure by Letters Patent, is—

1. In a stirrer and grainer, a shaft and means for rotating it, a spool on the shaft, ribs pivoted to the spool and adjustably secured in place, blades on the ribs, the blades on certain of the ribs facing opposite the direction of rotation and blades on other ribs extending in the direction of rotation.

2. In a stirrer and grainer, a hollow shaft, a shaft on which the hollow shaft is slidable, a spool on the hollow shaft, ribs pivoted to the spool, arms adjustably held, to which the ribs are pivoted and blades on the ribs and means for rotating the shaft.

3. In a stirrer and grainer, a kettle having a central opening in its bottom, a shaft depending into the kettle, a spool on the shaft, a guide-pin on the spool depending into the opening in the bottom of the kettle, ribs pivoted to the spool and adjustably held, blades on the ribs oppositely set for coating and scraping the surface of the kettle and means for rotating the shaft.

4. In a stirrer and grainer, a shaft, means for its rotation, a spool on the shaft, curved ribs pivoted to the spool, adjustable means for holding the ribs and blades on the ribs, the blades in certain ribs being oppositely disposed with relation to blades of other ribs.

In testimony whereof I affix my signature in the presence of two witnesses.

R. F. MACKINZIE.

Witnesses:
   J. A. CURTIS,
   P. GRABLER.